(12) United States Patent
Frait (10) Patent No.: US 8,092,330 B2
(45) Date of Patent: Jan. 10, 2012

(54) CONTROL FOR AN AUTOMATIC TRANSMISSION

(75) Inventor: Steve A. Frait, Milan, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 368 days.

(21) Appl. No.: 12/562,216

(22) Filed: Sep. 18, 2009

(65) Prior Publication Data

US 2011/0067516 A1  Mar. 24, 2011

(51) Int. Cl.
*F16H 31/00* (2006.01)
(52) U.S. Cl. ........................................................ 475/132
(58) Field of Classification Search .................... 475/132
See application file for complete search history.

(56) References Cited

U.S. PATENT DOCUMENTS

| | | | |
|---|---|---|---|
| 4,244,678 A | 1/1981 | Uehara et al. | |
| 4,598,612 A | 7/1986 | Ideta | |
| 5,305,663 A | 4/1994 | Leonard et al. | |
| 5,738,602 A | 4/1998 | Morita et al. | |
| 5,807,207 A * | 9/1998 | Hisano et al. | 477/116 |
| 5,876,303 A * | 3/1999 | Yu | 477/116 |
| 5,895,334 A * | 4/1999 | Yu | 475/128 |
| 6,110,072 A | 8/2000 | Harada et al. | |
| 6,135,919 A | 10/2000 | Shimakura | |
| 6,319,164 B1 | 11/2001 | Runde et al. | |
| 6,692,402 B2 | 2/2004 | Nakamori et al. | |
| 6,769,502 B2 | 8/2004 | Nakamori et al. | |
| 6,840,889 B2 | 1/2005 | Aoki et al. | |
| 6,960,150 B2 | 11/2005 | Armstrong et al. | |
| 7,194,349 B2 | 3/2007 | Surianarayanan et al. | |
| 7,261,662 B2 | 8/2007 | Nozaki et al. | |
| 7,351,175 B2 | 4/2008 | Kraxner et al. | |
| 7,789,797 B2 * | 9/2010 | Chen et al. | 477/116 |
| 7,794,356 B2 * | 9/2010 | Muta et al. | 477/3 |
| 2001/0009881 A1 | 7/2001 | Albs et al. | |
| 2007/0066435 A1 | 3/2007 | Takagi et al. | |

* cited by examiner

*Primary Examiner* — Dirk Wright
(74) *Attorney, Agent, or Firm* — David B. Kelley; MacMillan, Sobanski & Todd, LLC (57) ABSTRACT

A system for controlling a transmission includes a gear selector, a manual valve for connecting a pressure source alternately to Drive and Reverse lines in response to movement of the gear selector between selected Drive and Reverse positions, first and second solenoid-actuated valves, the first valve connecting the pressure source to a first control element, the second valve connecting the Reverse line to a second control element when the Reverse position is selected, a third solenoid-actuated valve connecting the Drive line to a third control element when the Drive position is selected, and a control valve through which pressure in the first control element is vented when the Drive position is selected.

19 Claims, 6 Drawing Sheets

Fig. 1

| FRICTION ELEMENT APPLICATION CHART | | | | | | |
|---|---|---|---|---|---|---|
| GEAR | FC 46 | RC 48 | IC 50 | LRC 54 | HC 52 | OWC |
| P |  |  |  | (X) |  |  |
| R |  | X |  | X |  |  |
| 1 |  |  |  |  |  | X |
| 2 | X |  | X |  |  | O/R |
| 3 | X | X |  |  |  | O/R |
| 4 | X |  |  |  | X | O/R |
| 5 |  | X |  |  | X | O/R |
| 6 |  |  | X |  | X | O/R |

X DENOTES THAT CLUTCH IS APPLIED
(X) DENOTES THAT CLUTCH MAY BE APPLIED

| GEAR | PC1 NL | PC2 NH | PC3 NL | PC4 NH | PC5 NH |
|---|---|---|---|---|---|
| P |  | X |  |  | X |
| R |  |  |  |  | X |
| 1 | X | X |  |  | X |
| 2 | X | X | X | X | X |
| 3 | X |  |  | X | X |
| 4 | X | X |  | X |  |
| 5 |  |  |  | X |  |
| 6 |  | X | X | X |  |

SOLENOID APPLICATION TABLE

X DENOTES THAT THE SOLENOID IS ON

CONTROL FOR AN AUTOMATIC TRANSMISSION

BACKGROUND OF THE INVENTION

1. Field of the Invention

This invention relates generally to controlling an automatic transmission, particularly to a system having direct electronic shift control.

2. Description of the Prior Art

Most current automatic transmissions use a solenoid in conjunction with a regulator & latch valve to control independently the clutches and brakes, which are applied and released to produce the transmission gear ratios. A valve body assembly that includes a solenoid with a regulator & latch valve for this purpose requires many layers to accommodate all of the solenoids and valves. Such a valve body adds cost and size due to the many valve body layers, and it creates hydraulic response time delays due to the multiple stages from solenoid output to regulator valve input to regulator output, which must be controlled. Further, these delays are temperature sensitive.

Conventional automatic transmissions use bleed flows to improve the hydraulic controls performance and repeatability, but these flows result in lost hydraulic power, which power loss is detrimental to fuel economy.

Variable displacement pump controls are indirectly controlled, which can introduce system instability and deliver a fluid flow rate that is much higher than needed by the transmission, further reducing fuel economy.

Most transmissions use a one-way-clutch to produce a synchronous upsift between first gear and second gear. A conventional one-way-clutch is costly and creates internal drag in the transmission.

A need exists in the industry for an electro-hydraulic control that permits a reduction is size of the valve body, reduces the number of valves, improves vehicle fuel economy and shortens the time required to execute gear shifts.

SUMMARY OF THE INVENTION

A system for controlling a transmission includes a gear selector, a manual valve for connecting a pressure source alternately to Drive and Reverse lines in response to movement of the gear selector between selected Drive and Reverse positions, first and second solenoid-actuated valves, the first valve connecting the pressure source to a first control element, the second valve connecting the Reverse line to a second control element when the Reverse position is selected, a third solenoid-actuated valve connecting the Drive line to a third control element when the Drive position is selected, and a control valve through which pressure in the first control element is vented when the Drive position is selected.

The invention further contemplates a method for controlling gear changes of a vehicle transmission, comprising connecting a pressure source alternately to hydraulic lines corresponding to selectable Drive and Reverse positions of a gear selector, producing reverse drive by engaging first and second control elements in response to selecting the Reverse position, and producing forward drive by engaging the second and a third control elements and disengaging the first control element in response to selecting the Drive position.

The control system allows the valve body to have two layers rather than the conventional four layers, thereby reduce the valve body height by about 30 mm compared to conventional valve body configurations, permitting it to be packaged in a smaller space.

By removing the regulator valve, delays and sensitivities are reduced such that the period required to perform a gear changes is are shortened to about 150 Ms.

The number of valves in the control system is reduced from about 14 to about eight. This reduction combined with the reduction of two valve bodies offsets the cost of additional solenoids, producing a net cost reduction for the entire electro-hydraulic control assembly.

The scope of applicability of the preferred embodiment will become apparent from the following detailed description, claims and drawings. It should be understood, that the description and specific examples, although indicating preferred embodiments of the invention, are given by way of illustration only. Various changes and modifications to the described embodiments and examples will become apparent to those skilled in the art.

DESCRIPTION OF THE DRAWINGS

The invention will be more readily understood by reference to the following description, taken with the accompanying drawings, in which.

DESCRIPTION OF THE PREFERRED EMBODIMENT

Figure 1:
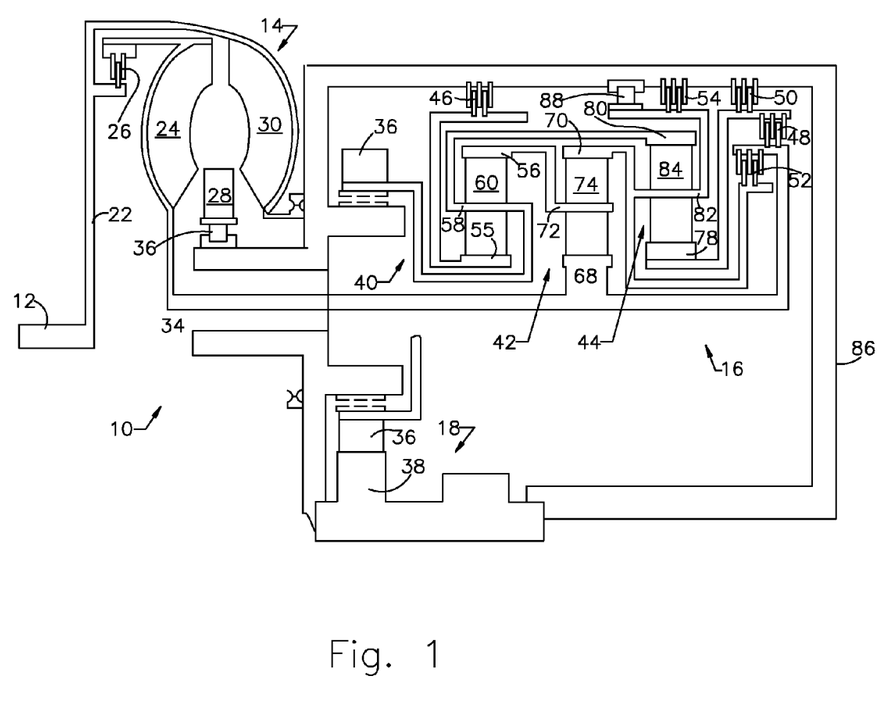
FIG. 1 is a schematic diagram of the kinematic arrangement of an automatic transmission to which the control method and system can be applied.

Referring now to the drawings, there is illustrated in FIG. 1 the powertrain 10 for a motor vehicle, which includes an engine 12, torque converter 14, transmission 16, and an output drive mechanism 18. The engine 12 is an internal combustion engine well known to those skilled in the art. The torque converter 14 includes having an impeller 30 connected through an input shell and flex plate 22 with the crankshaft of the engine 12, a turbine 24, friction clutch 26, and a stator 28, which is grounded through a one-way clutch 36. The turbine 24 and clutch 26 are driveably connected to a transmission input shaft 34. The output drive mechanism 18 includes meshing output gears 36 and 38.

The transmission 16 includes three planetary gearsets 40, 42, 44, and five friction control elements, which are torque-transmitting clutches and brakes 046, 48, 50, 52, and 54.

Gearset 40 includes a sun gear 55, ring gear 56, and planet carrier 58, which is comprised of a plurality of planet pinions 60, rotatably mounted on the planet carrier 58 and disposed in meshing relationship with sun gear 55 and ring gear 56. The sun gear 55 is connected to a set of friction plates, which are part of a forward brake 46, also referred to as the CB1234.

Gearset 42 includes a sun gear 68, ring gear 70, planet carrier 72, and planet pinions 74, rotatably mounted on planet carrier 72 and disposed in meshing relationship with sun gear 68 and ring gear 70. The planet carrier 72 is continuously connected with ring gear 56 and disposed in meshing relationship with sun gear 78 and ring gear 80. Sun gear 68 is continuously connected with the input shaft 34.

Gearset 44 includes a sun gear 78, ring gear 80, planet carrier 82, and planet pinions 84, rotatably supported on carrier 82. The planet carrier 82 is drivingly connected to ring gear 70 and to friction plates, which are components of a low-reverse brake 54, also referred to as the CBLR. Ring gear 80 is driveably connected with the planet carrier 58. Planet carrier 82 is also driveably connected to friction plates, which are components of a high clutch 52, also referred to as the C456.

Sun gear 78 is continuously connected with friction plates, which are components of an intermediate brake 50, also referred to as the CB26, and to friction plates, which are components of a reverse clutch 48, also referred to as the C35R.

The planetary gearsets 40, 42, 44 and clutches and brakes 46, 48, 50, 52, 54 are located within a transmission housing 86.

The ring gear 80 and planet carrier 58 are continuously connected with the output gear 36. The output gears 36, 38 drive the output mechanism 18, which transmits power to the front wheels. The transmission 16 is generally transversely mounted relative to the longitudinal axis of a vehicle.

Figure 2:
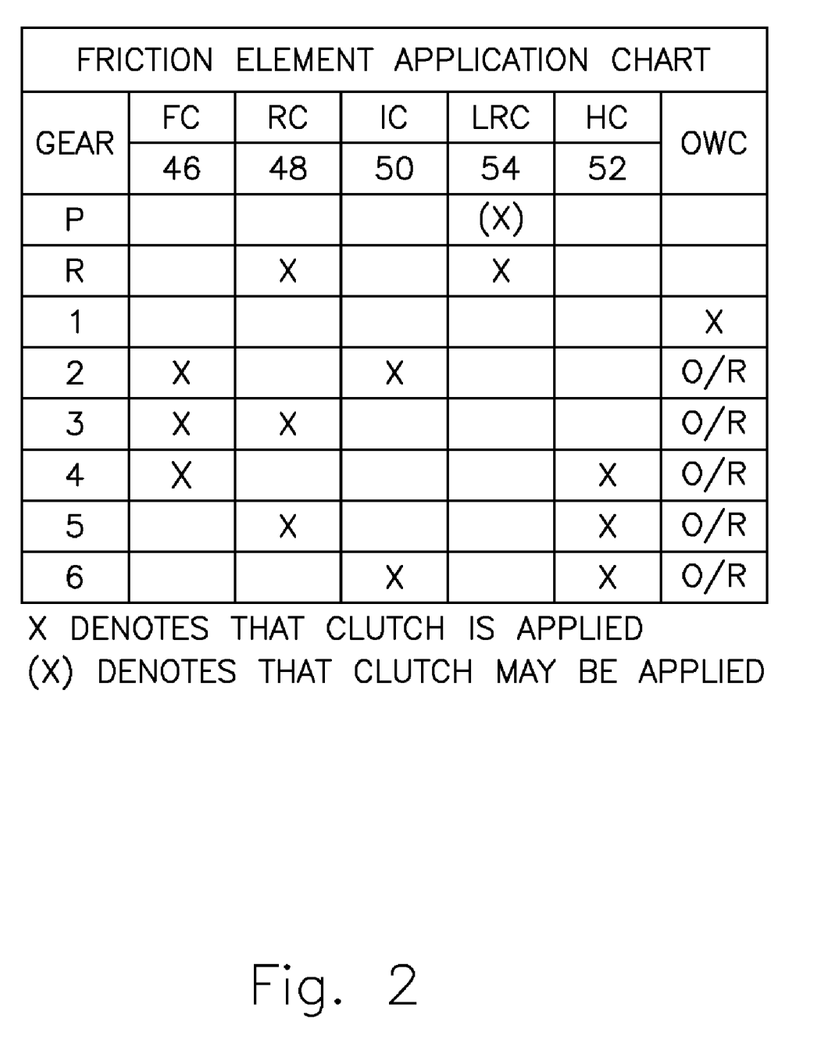
FIG. 2 is a table that shows the applied and released states of the friction control elements for each of the forward gears and the reverse gear of the transmission of FIG. 1.

As FIG. 2 illustrates, the clutches and brakes (also called friction control elements) 46, 48, 50, 52, 54 are selectively engaged in combinations of two to produce six forward speed ratios and one reverse speed ratio between the input shaft 34 and the output mechanism 18. The CB1234 or forward brake control element 46 is engaged for the first, second, third, and fourth forward speed ratios; the C456 or high clutch control element 52 is engaged for the fourth, fifth, and sixth forward speed ratios; the CBLR or low reverse brake control element 54 is engaged for the reverse speed ratio and first gear engine braking; the C35R reverse clutch control element 48 is engaged for the third and fifth forward speed ratios and the reverse speed ratio; and the CB26 intermediate brake control element 50 is engaged in the second and sixth forward speed ratios.

A one-way brake 88, disposed between the planet carrier member 82 and a shell of housing 86, provides a non-coast braking low ratio, if desired.

Figure 3A:
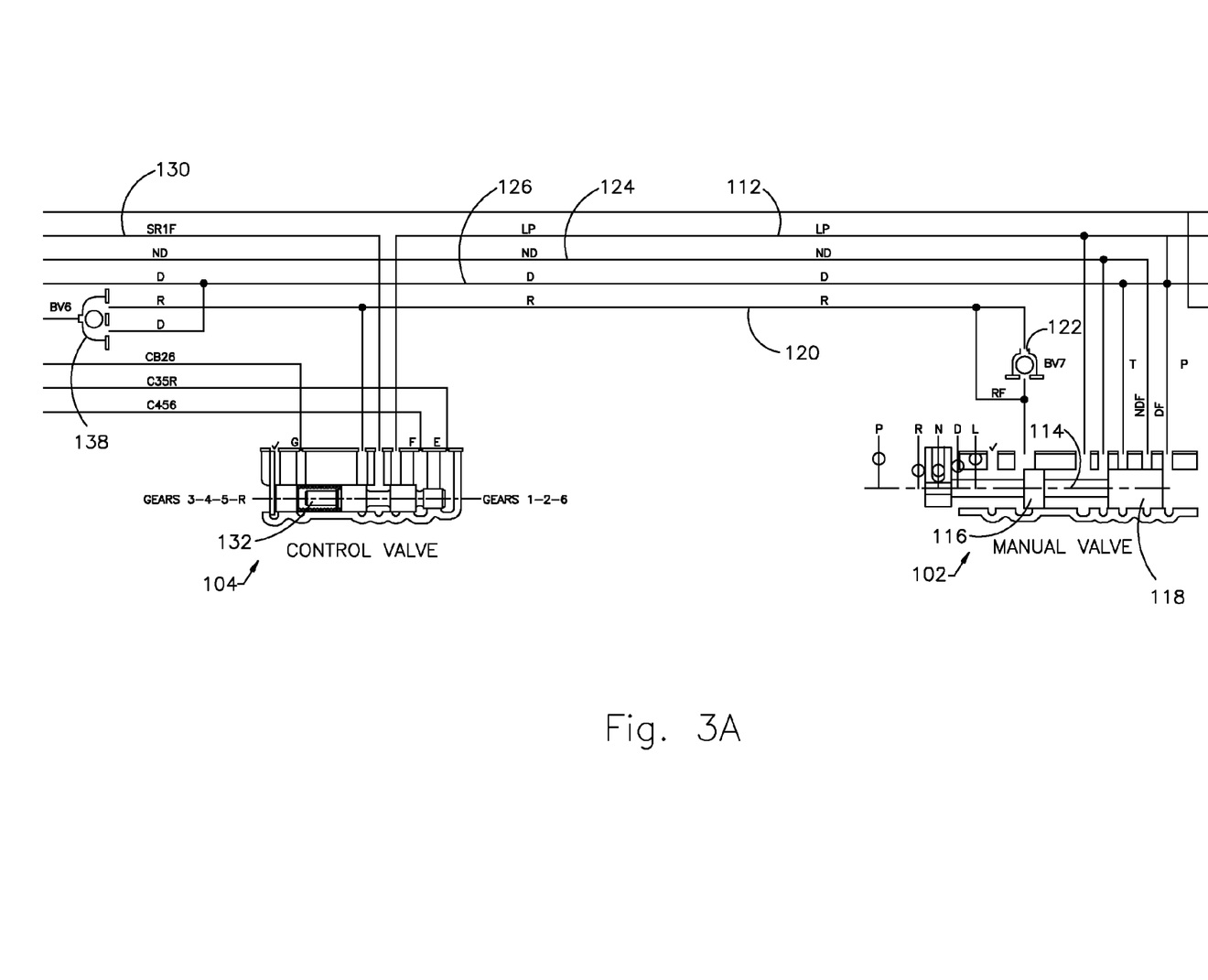
FIGS. 3A and 3B comprise a schematic diagram of a portion of the hydraulic control system of the transmission of FIG. 1.
Figure 3B:
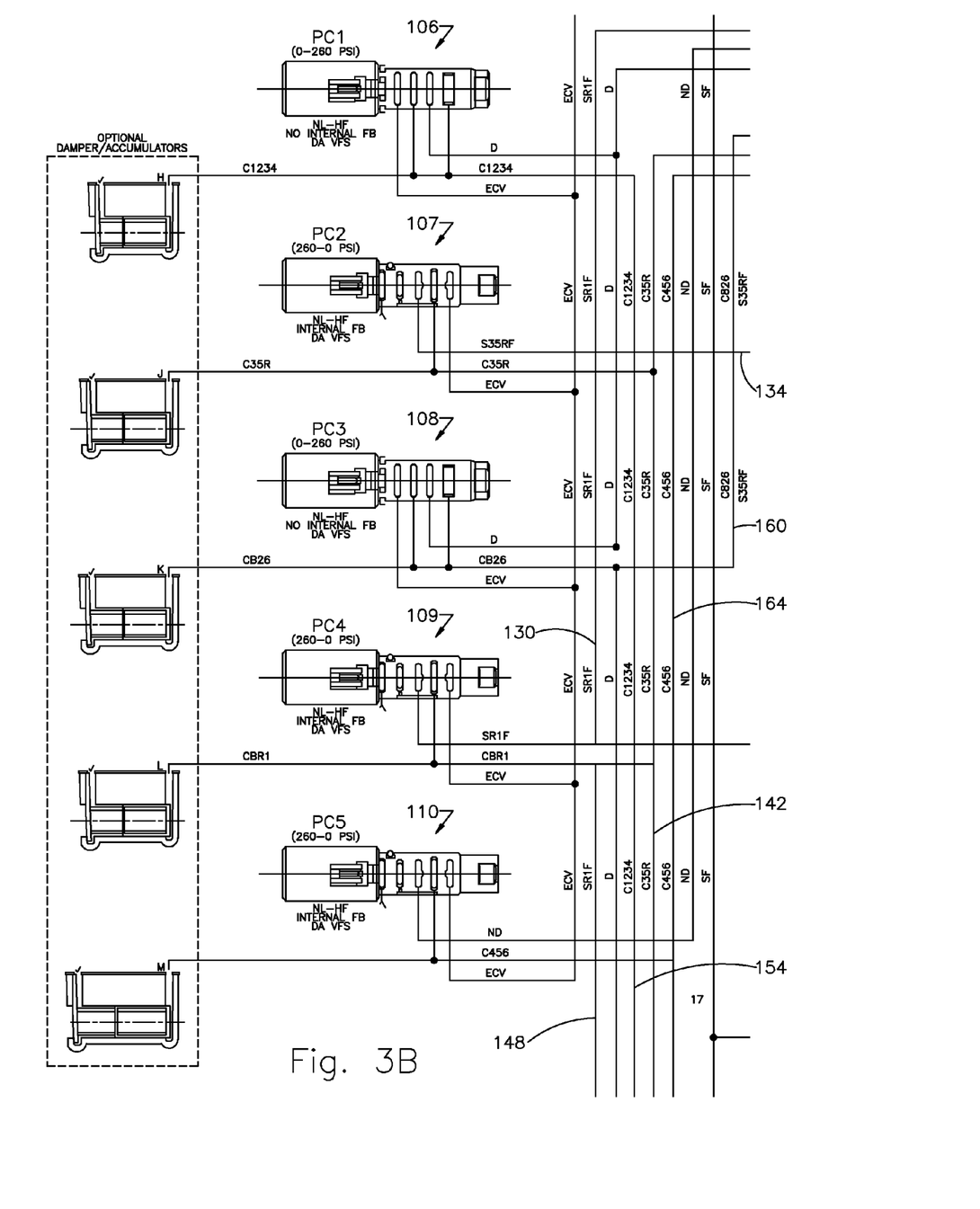

Referring to FIGS. 3A and 3B, the hydraulic system 100 that controls operation of the friction control elements 46, 48, 50, 52, 54 includes a manual valve 102, control valve 104, and five variable-force, solenoid-actuated valves PC1 106, PC2 107, PC3 108, PC4 109, and PC5 110. The state of solenoids PC1 106 and PC3 108 is normally low (NL), i.e., the output pressure of the corresponding valve is low until electric current or voltage applied to the solenoid tends to increase the output pressure. The state of solenoids PC2 107, PC4 109, and PC5 110 is normally high (NH), i.e., the output pressure of the corresponding valve is high until electric current or voltage applied to the solenoid tends to lower the output pressure.

Figure 4:
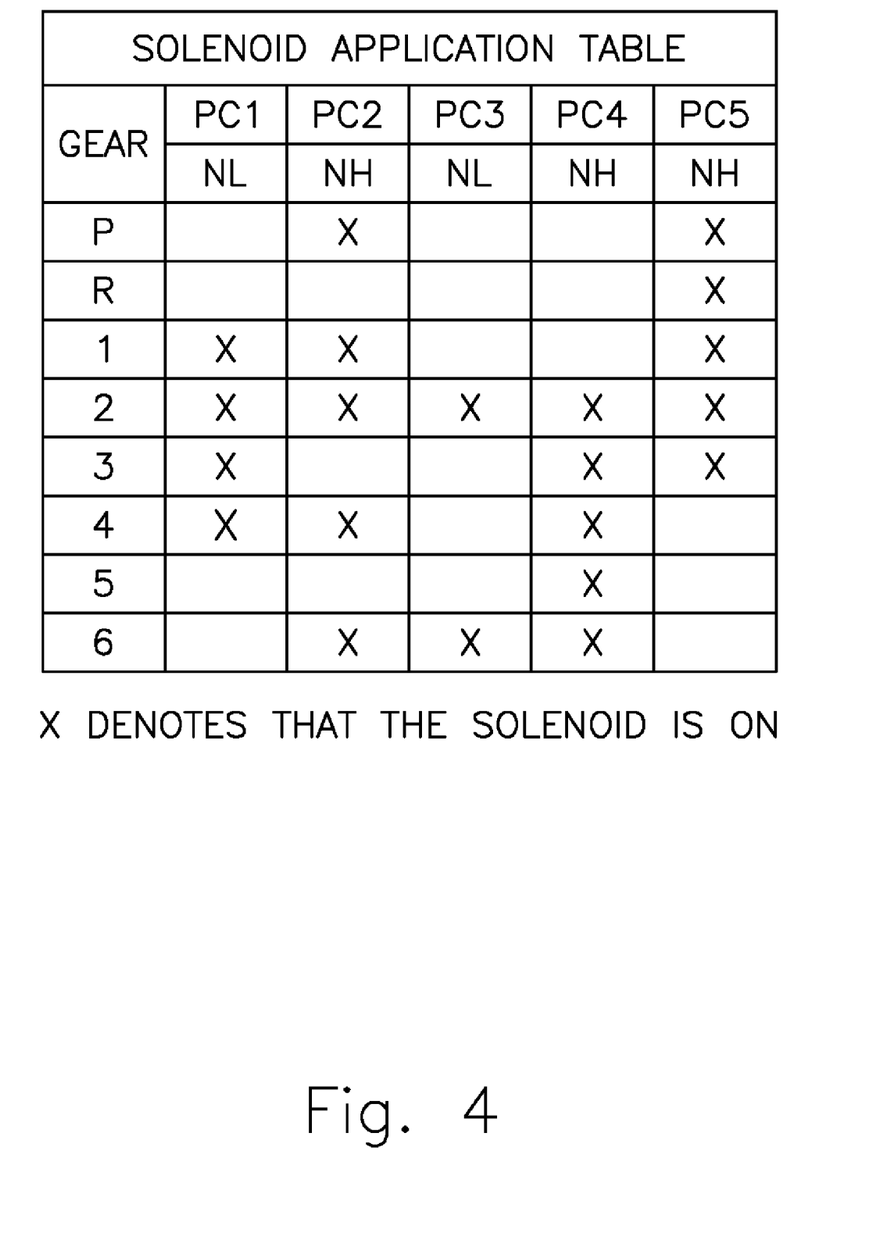
FIG. 4 is a table that shows the ON and OFF states and the normally high and normally low states of solenoids that actuate valves, which communicate with the friction control elements of FIG. 1.

FIG. 4 summarizes the normal states, NL and NH, of the solenoid-actuated valves PC1 106, PC2 107, PC3 108, PC4 109, PC5 110.

Figure 5:
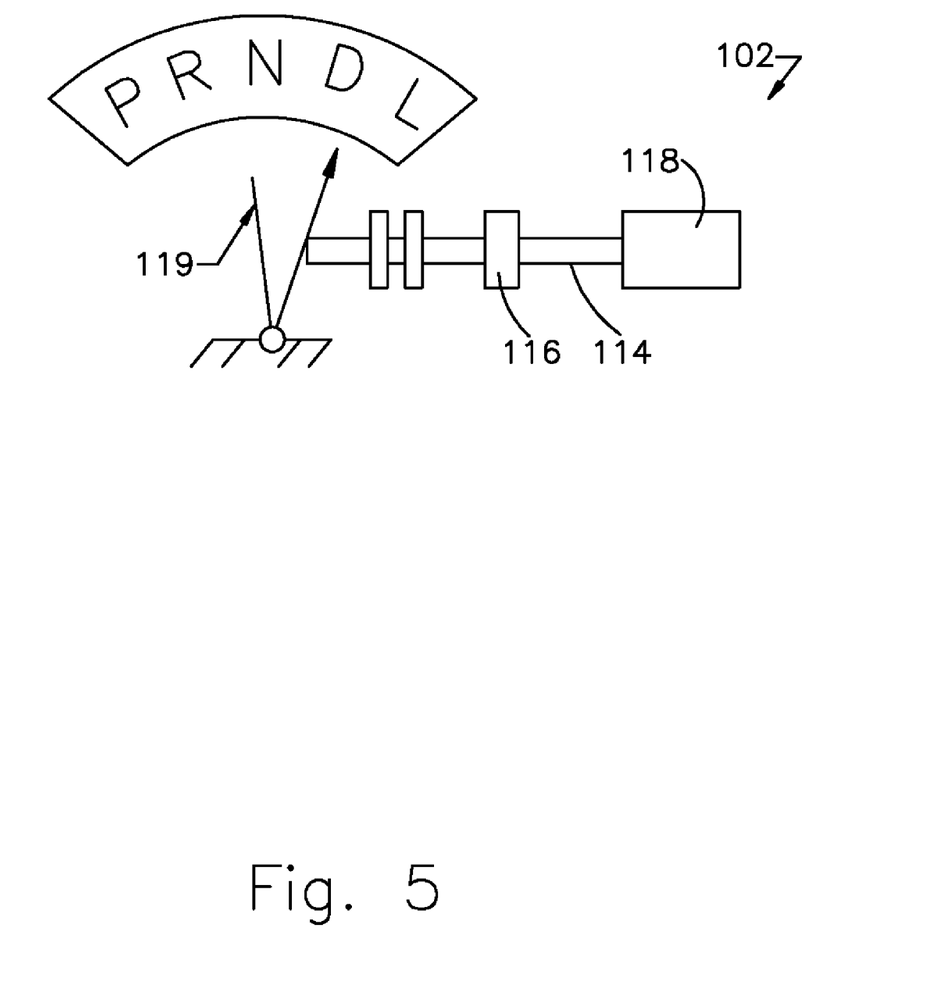
FIG. 5 is a schematic diagram showing the gear selector connected to the spool of the manual valve.

When engine 12 is running, a fluid source at line pressure supplies fluid through LP line 112 to manual valve 102, whose spool 114 is formed with control lands 116, 118. As FIG. 5 illustrates, the spool 114 moves along the chamber of manual valve 102 in response to the vehicle operator moving the transmission gear selector 119 manually among its PRNDL positions, i.e., Park, Reverse, Neutral, Drive and Low.

As FIGS. 3A and 3B show, when the spool 114 of manual valve 102 is in the P position, LP line 112 is blocked by land 118 and the manual valve produces no output pressure. When the spool 114 of manual valve 102 is in the R position, LP line 112 is connected only to R-line 120 through a check valve 122. When the spool 114 of manual valve 102 is in the N position, LP line 112 is connected to ND-line 124. When the spool 114 of manual valve 102 is in the D position, LP line 112 is connected to ND-line 124 and D-line 126. When the spool 114 of manual valve 102 is in the L position, LP line 112 is connected to ND-line 124 and D-line 126.

When engine 12 is running, LP line 112 carries line pressure to control valve 104. When control valve 104 is positioned in the default position. LP line 112 will connect to SR1F through valve 132. SR1F line 130 feeds solenoid valve PC4 109, which connects to CBR1 line 148. Pressure in CBR1 line 148 causes the low-reverse brake 54 to engage.

When CB26 160 is able to be pressurized due to the gear selector 119 being in the D position, the spool 132 of control valve 104 is urged by pressure in to shuttle to the right-hand end of the valve 104, the position shown in FIG. 3a, closing SR1F line 130 from LP 112 and instead connected to Reverse 120. D-line 126 is connected through shuttle check valve 138 and S35RF line 134 to PC2 solenoid 107. The output pressure of PC2 solenoid 107 is communicated through line 142 to reverse clutch 48, which it is then engaged. Similarly, low reverse brake 54 is pressurized through LP-line 112, through control valve 104, feeding SR1F line 130 to PC4 solenoid 109, and CBR1 line 148. As FIG. 2 indicates, reverse drive is produced when clutch 48 and brake 54 are applied currently. Reverse gear is only produced if the manual valve is placed in the R position.

The ND circuit allows the 456 clutch to remain engaged when the gear selector 119 is moved from D to N and then back to D during high speed driving, in a higher gear. This allows for re-engagement back into the higher gear with only one clutch having to be reapplied, producing a smoother gear shift. But while in N, the control valve 104 forces the LR clutch off, so the transmission does not enter a tie-up condition.

The LR clutch is supplied with line pressure directly, which allows the LR clutch to be engaged in Park and Neutral, producing smoother engagements into R and first gear since only one clutch needs to be engaged, i.e., the 35R clutch for Reverse and the 1234 clutch for first gear.

When engine 12 is running and the gear selector 119 is moved to the D position, spool 132 shuttles to the left-hand end of control valve 104 due to line pressure in LP line 112 being connected by PC5 valve 110 or C35R line 142, whereupon pressure in low-reverse clutch 54 is vented through valve 102 via reverse line 120, PC2 solenoid 107, S35RF line 134, check valve 138, D35R line 136, and a vent port 150 in control valve 104. Therefore, reverse clutch 48 cannot be applied and the transmission 16 cannot operate in reverse drive when the gear selector 119 is in the D position.

When engine 12 is running and the gear selector 119 is moved to the D position, forward brake 46 is engaged by pressure in D line 126 through PC1 solenoid 106, C1234 line 154. When engine 12 is running and the gear selector 119 is moved to the D position, LP line 112 carries line pressure to control valve 132. Line pressure is carried from control valve 132 to solenoid valve PC4 109, if pressure in circuits 142, 160, 164 is low. PC4 109 connects line pressure through CBR1 line 148 to the low reverse brake 54. Pressure in CBR1 line 148 causes the low-reverse brake 54 to engage. As FIG. 2 indicates, forward drive in low gear is produced when forward brake 46 and low reverse brake 54 are applied currently.

The transmission 16 upshifts from first gear to second gear upon applying electric current to solenoid PC4, causing the low reverse brake 54 to disengage, and applying electric current to solenoid PC3 causing intermediate brake 50 to engage.

The transmission 16 upshifts from second gear to third gear, upon removing electric current from solenoid PC3, causing intermediate brake 50 to disengage, and removing the electric current to solenoid PC2, causing reverse clutch 48 to engage.

The transmission 16 upshifts from third gear to fourth gear, upon reapplying electric current on solenoid PC2, causing reverse clutch 48 to disengage, and removing electric current to solenoid PC5, causing high clutch 52 to engage.

If a failure of the electronic system that controls the solenoid-actuated valves PC1 106, PC2 107, PC3 108, PC4 109, and PC5 110 occurs, each solenoid-actuated valve defaults to its NH or NL state. If engine 12 is also running, the transmission 16 can produce forward drive in fifth gear when the gear selector 119 is in the D position. Due to the normally high state of PC2 solenoid valve 107, line pressure in LP line 112 is directed by valve 107 to S35RF line 134 through shuttle valve 138, which is fed drive line 126, which causes spool 132 to shuttle to the left-hand end of control valve 104. This causes the low-reverse clutch 54 to be drained through SR1F line 134, through control valve 132, to Reverse line 120 to valve 102 where it is vented through the reverse port, preventing operation of the transmission 16 in reverse when valve 114 is in the drive position. The reverse clutch 48 is pressurized from drive line 124 through the PC2 solenoid valve 107, due to its default state being normally high. Also, the High clutch is pressurized from ND line 124 through PC1 solenoid valve 106, due to its default state being normally high.

If a failure of the electronic system that controls the solenoid-actuated valves PC1 106, PC2 107, PC3 108, PC4 109, and PC5 110 occurs and engine 12 is running, transmission 16 can produce reverse drive when the gear selector 119 is in the R position. Due to the normally high state of PC2 solenoid valve 107, reverse line 120 is directed to S35RF 134, through shuttle valve 138, which is fed reverse line 120, which moves spool 132 to the left and also brings on the reverse clutch 48. Although the control valve 132 has shuttled to the left PC4 solenoid valve 109 is connected to reverse line 120 through the control valve. This allows the low reverse brake 54 to be applied through CBR1 line 148. PC5 is also a normally high solenoid, but it is not allowed to be engaged, because the feed C456line 164 is fed by ND line 124, which is vented at the manual valve 102 when in the reverse position. As FIG. 2 shows, transmission 16 produces reverse drive when the reverse clutch 48 and low reverse brake 54 are applied concurrently.

In accordance with the provisions of the patent statutes, the preferred embodiment has been described. However, it should be noted that the alternate embodiments can be practiced otherwise than as specifically illustrated and described.

The invention claimed is:

1. A system for controlling a transmission, comprising:
  a manual valve for connecting a pressure source alternately to Drive and Reverse lines in response to movement between selected Drive and Reverse positions;
  first and second solenoid-actuated valves, the first valve connecting the pressure source to a first control element, the second valve connecting one of the Reverse line and the Drive line to a second control element when either the Reverse position or the Drive position is selected;
  a third solenoid-actuated valve connecting the Drive line to a third control element when the Drive position is selected.

2. The system of claim 1 further comprising:
  a fourth control element; and
  a fourth solenoid-actuated valve connecting the Drive line to the fourth control element when the Drive position is selected and producing forward drive in a first gear.

3. The system of claim 1 further comprising:
  a fifth control element; and
  a fifth solenoid-actuated valve connecting the Drive line to the fifth control element when the Drive position is selected and producing forward drive in a higher forward gear than a third forward gear.

4. The system of claim 1, further comprising:
  a control valve having a first state in which the first and second control elements are concurrently engaged and reverse drive is produced; and
  a second state in which a fourth control element is connected to the Reverse line when the first and second control elements are concurrently engaged and forward drive in a first gear is produced.

5. The system of claim 1, further comprising:
  a fourth control element; and
  a control valve that includes:
  a control port;
  a spring; and
  a spool urged by the spring and pressure toward a first position in which the fourth control element can be engaged, the fourth element being pressurized only when the Reverse position is selected.

6. The system of claim 1, further comprising:
  a fifth control element; and
  a control valve that includes:
  a control port;
  a spring; and
  a spool urged by the spring and pressure in one of the second and fifth control element.

7. A system for controlling a transmission, comprising:
  a manual valve for connecting a pressure source alternately to Drive and Reverse lines in response to movement between selected Drive and Reverse positions;
  first and second solenoid-actuated valves, the first valve having a normally high default state at which the pressure source is connected to a first control element, the second valve having a normally high default state at which the Reverse line is connected to a second control element when the Reverse position is selected;
  a third solenoid-actuated valve having a normally low default state at which the Drive line is connected to a third control element when the Drive position is selected;
  a fourth control element; and
  a control valve through which pressure in the second control element is vented through the manual valve and a vent port when the Drive position is selected.

8. The system of claim 7 wherein the control valve includes:
  a first state in which the fourth and second control elements are concurrently engaged and reverse drive is produced; and
  a second state in which the vent port is connected to the second control element, the first and fourth control elements are concurrently engaged and forward drive in a first gear is produced.

9. The system of claim 7 further comprising:
  a fourth control element;

a fourth solenoid-actuated valve connecting the Drive line to the fourth control element when the Drive position is selected and producing one of a forward drive a reverse drive.

10. The system of claim 7 further comprising:
a fifth control element;
a fifth solenoid-actuated valve connecting the Drive line to the fifth control element when the Drive position is selected and producing forward drive in a forward gear higher than a third forward gear.

11. The system of claim 7 wherein the control valve includes:
a spring;
a spool urged by the spring and pressure in the Reverse line toward a first position in which the first and second control elements are concurrently engaged, and urged by pressure in a line connected to an exit of the second valve toward a second position in which the vent port is connected to the first control element, thereby disengaging the first control element;
a spool urged by the spring and pressure toward a position in which the first and second control elements are concurrently engaged, and urged by pressure in a line connected to an exit of the second valve toward a position in which the vent port is connected to the first control element, thereby disengaging the first control element.

12. The system of claim 7 wherein the control valve includes:
a spring;
a spool urged by the spring and pressure in the Reverse line in a first direction toward a first position in which the first and second control elements are concurrently engaged, and urged in a second direction opposite the first direction by pressure in a line connected to an exit of the second valve toward a second position in which the vent port is connected to the first control element and the first control element is disengaged.

13. The system of claim 7 further comprising a manually operated gear selector having selected positions corresponding to the Drive and Reverse positions of the manual valve.

14. A method for controlling gear changes of a vehicle transmission, comprising the steps of:
(a) connecting a pressure source alternately to hydraulic lines corresponding to selectable Drive and Reverse positions of a gear selector;
(b) producing reverse drive by engaging first and second control elements in response to selecting the Reverse position;
(c) producing forward drive by engaging the second and a third control elements and disengaging the first control element in response to selecting the Drive position.

15. The method of claim 14, wherein step (c) further comprises:
using the pressure source to exhaust pressure from the first control element in response to selecting the Drive position.

16. The method of claim 14, further comprising:
using the pressure source to engage a fourth control element and to produce forward drive in a second gear in response to selecting the Drive position.

17. The method of claim 14, further comprising:
using the pressure source to engage a fifth control element and to produce forward drive in a third gear in response to selecting the Drive position.

18. The method of claim 14, wherein step (a) further comprises:
using the pressure source to a circuit that transmits pressure to a fifth control element in response to selecting one of a Neutral and Drive gear selector position.

19. The method of claim 14 further comprises:
using the pressure source from a fifth control element in response to selecting a Neutral gear selector position; and
venting the first control element through a manual valve.

\* \* \* \* \*